US012747727B2

(12) United States Patent
Enke

(10) Patent No.: US 12,747,727 B2
(45) Date of Patent: Sep. 29, 2026

(54) SOLENOID CONCEPT FOR PUMP CONTROL OF A VARIABLE DISPLACEMENT PISTON PUMP

(71) Applicant: Hamilton Sundstrand Corporation, Charlotte, NC (US)

(72) Inventor: Olaf Enke, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 63 days.

(21) Appl. No.: 18/749,934

(22) Filed: Jun. 21, 2024

(65) Prior Publication Data

US 2025/0389267 A1 Dec. 25, 2025

(51) Int. Cl.
*F04B 49/00* (2006.01)
*F04B 1/295* (2020.01)
(Continued)

(52) U.S. Cl.
CPC ............ *F04B 49/002* (2013.01); *F04B 1/295* (2013.01); *F04B 1/324* (2013.01); *F04B 17/04* (2013.01);
(Continued)

(58) Field of Classification Search
CPC ...... F04B 17/04; F04B 35/045; F04B 49/002; F04B 2203/09; F04B 2205/05;
(Continued)

(56) References Cited

U.S. PATENT DOCUMENTS 4,487,109 A 12/1984 Burandt et al.
4,600,364 A 7/1986 Nakatani et al.
(Continued)

FOREIGN PATENT DOCUMENTS

| | | |
|---|---|---|
| CN | 203960938 U | 11/2014 |
| DE | 102011114388 B3 | 11/2012 |
| EP | 1067293 A2 | 1/2001 |

OTHER PUBLICATIONS

Proportional gain and proportional band explained—Published Nov. 1, 2022 (Year: 2022).

*Primary Examiner* — Peter J Bertheaud
(74) *Attorney, Agent, or Firm* — Kinney & Lange, P.A.

(57) ABSTRACT

Apparatus and associated methods relate to using an electro-hydraulic solenoid valve to provide regulation of fluid displacement of a variable-displacement hydraulic pump. A mechanical control mechanism is configured to control displacement of hydraulic fluid pumped from a hydraulic input port to a hydraulic output port. The electro-hydraulic solenoid valve regulates fluid conductivity between a hydraulic output port of the variable-displacement hydraulic pump and a hydraulic control cylinder, which operates a hydraulic control piston coupled to the mechanical control mechanism controlling fluid displacement. An electronic control unit is configured to generate and transmit an electrical control signal to the electro-hydraulic solenoid valve in response to a metric of the variable-displacement hydraulic pump as measured by a transducer. The electronic control unit generates the electrical control signal so as to control the metric measured to within a predetermined control band about a target value.

18 Claims, 3 Drawing Sheets

(51) Int. Cl.

| | |
|---|---|
| ***F04B 1/324*** | (2020.01) |
| ***F04B 17/04*** | (2006.01) |
| ***F04B 35/04*** | (2006.01) |
| ***F04B 49/06*** | (2006.01) |
| ***F04B 49/08*** | (2006.01) |

(52) U.S. Cl.
CPC .......... *F04B 35/045* (2013.01); *F04B 49/065* (2013.01); *F04B 49/08* (2013.01); *F04B 2203/09* (2013.01); *F04B 2205/05* (2013.01); *F15B 2211/20553* (2013.01)

(58) Field of Classification Search
CPC ........ F04B 1/295; F04B 1/324; F04B 49/065; F04B 49/08; F15B 2211/20553
See application file for complete search history.

(56) References Cited

U.S. PATENT DOCUMENTS

| | | | | |
|---|---|---|---|---|
| 4,766,921 | A | 8/1988 | Williams | |
| 6,347,516 | B1 | 2/2002 | Bolz et al. | |
| 8,269,360 | B2 | 9/2012 | Boisvert et al. | |
| 8,596,057 | B2 | 12/2013 | Du | |
| 10,030,656 | B2 | 7/2018 | Valkenberg | |
| 2011/0079006 | A1 | 4/2011 | Du | |
| 2011/0120431 | A1 | 5/2011 | Lilly | |
| 2011/0138799 | A1* | 6/2011 | Wagner ................. | F04B 49/002<br>60/445 |
| 2015/0337871 | A1 | 11/2015 | Du | |
| 2016/0363117 | A1 | 12/2016 | Ligenfelter et al. | |
| 2021/0332565 | A1* | 10/2021 | Akami .................. | F15B 11/161 |
| 2023/0125840 | A1 | 4/2023 | Rutar | |
| 2023/0130997 | A1 | 4/2023 | Rutar et al. | |
| 2023/0204029 | A1 | 6/2023 | Ni et al. | |

* cited by examiner

SOLENOID CONCEPT FOR PUMP CONTROL OF A VARIABLE DISPLACEMENT PISTON PUMP

BACKGROUND

Various types of hydraulic pumps are used for pumping hydraulic fluid in hydraulic systems. Variable-displacement hydraulic pumps are a type of hydraulic pump in which the displacement of hydraulic fluid is controllable. There are various classifications of variable-displacement hydraulic pumps, such as, for example, vane pumps and hydraulic control piston pumps. Moreover, there are various types of each of these classifications of variable-displacement hydraulic pumps. For example, hydraulic control piston pumps can be of an inline axial type or a bent-axis type. Typically, electro-hydraulic control systems are used to control the operation of variable-displacement hydraulic pumps, including control of fluid displacement, of which such variable-displacement hydraulic pumps are capable. Such electro-hydraulic control systems typically include an electronic control unit and one or more Electro-Hydraulic Servo Valves (EHSVs).

Typically, EHSVs are spool valves that have spools within a cylinder that are positionally controlled by an electro-hydraulic solenoid valve. The position of the spool within the cylinder controls fluid conductivity through one or more fluid paths or fluid channels formed within the EHSV. This proportional control of position of the spool within the hydraulic cylinder then provides precise control of fluid conduction through the one or more fluid paths or fluid channels. Such control of fluid conductivity of the one or more fluid paths or fluid channels controls fluid flow therethrough and/or fluid pressure at output ports of the one or more fluid paths or fluid channels.

This control of fluid flow and/or fluid pressure provided by an EHSV can be used by the electronic control unit to configurate a mechanical control mechanism of the variable-displacement hydraulic pump. The electronic control unit of the electro-hydraulic control system can perform closed-loop control of one or more of various metrics of the variable-displacement hydraulic pump. For example, the electro-hydraulic solenoid valve can be configured to control an angle of a swash plate for an inline axial hydraulic control piston pump, or a pivot angle for a bent-axis hydraulic control piston pump. A transducer can be utilized to sense or measure the metric being controlled. For example, a Linear Variable Differential Transducer (LVDT) can be used to sense the mechanical position or configuration of the pump (e.g., the angle of a swash plate for an inline axial hydraulic control piston pump, or the pivot angle for a bent-axis hydraulic control piston pump). The transducer can then transmit the sensed metric to the electronic control unit.

The electronic control unit then generates an electrical control signal that causes the EHSV to position or configure the mechanical control mechanism based on the metric measured by the electronic control unit. For example, the electronic control unit might employ Proportional-Integral-Differential (PID) control for generating the electrical control signal provided to the EHSV. Such generation of the electrical control signal provided to the EHSV would then adjust the fluid conductivity through the EHSV, thereby controlling the fluid flow and/or fluid pressure provided to the mechanical control mechanism. Such an electro-hydraulic control system provides closed-loop control of the position or configuration of the mechanical control mechanism.

SUMMARY

Some embodiments relate to a system for controlling displacement of a hydraulic fluid pumped by a variable-displacement hydraulic pump. The system includes a first electro-hydraulic solenoid valve having input and output hydraulic ports in fluid communication with a hydraulic output port and a hydraulic control port of the variable-displacement hydraulic pump, respectively, thereby regulating fluid conductivity therebetween. The system includes a second electro-hydraulic solenoid valve having input and output hydraulic ports in fluid communication with the hydraulic control port and a hydraulic input port of the variable-displacement hydraulic pump, respectively, thereby regulating fluid conductivity therebetween. Such regulation of fluid conductivity as performed by first and second electro-hydraulic solenoid valves controls fluid displacement through the variable-displacement hydraulic pump. The system includes a transducer configured to measure a metric of the variable-displacement hydraulic pump. The system also includes an electronic control unit in conductive communication with the transducer and the first and second electro-hydraulic solenoid valves. The electronic control unit is configured to generate and transmit electrical control signals to the first and second electro-hydraulic solenoid valves so as to control the metric measured to within a predetermined control band about a target value.

Some embodiments relate to a method for controlling displacement of a hydraulic fluid pumped by a variable-displacement hydraulic pump. Fluid conductivity between a hydraulic output port and a hydraulic control port of the variable-displacement hydraulic pump is regulated by a first electro-hydraulic solenoid valve. Fluid conductivity between the hydraulic control port and a hydraulic input port of the variable-displacement hydraulic pump is regulated by a second electro-hydraulic solenoid valve. Such regulation of fluid conductivity as performed by first and second electro-hydraulic solenoid valves can control fluid displacement through the variable-displacement hydraulic pump. A metric of the variable-displacement hydraulic pump is measured by a transducer. Electrical control signals are generated by an electronic control unit and transmitted to the first and second electro-hydraulic solenoid valves, thereby controlling the metric measured to within a predetermined control band about a target value.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Apparatus and associated methods relate to using an electro-hydraulic solenoid valve to provide regulation of fluid displacement of a variable-displacement hydraulic pump. A mechanical control mechanism is configured to control displacement of hydraulic fluid pumped from a hydraulic input port to a hydraulic output port. The electro-hydraulic solenoid valve regulates fluid conductivity between a hydraulic output port of the variable-displacement hydraulic pump and a hydraulic control cylinder, which operates a hydraulic control piston coupled to the mechanical control mechanism controlling fluid displacement. An electronic control unit is configured to generate and transmit an electrical control signal to the electro-hydraulic solenoid valve in response to a metric of the variable-displacement hydraulic pump as measured by a transducer. The electronic control unit generates the electrical control signal so as to control the metric measured to within a predetermined control band about a target value.

Figure 1A:
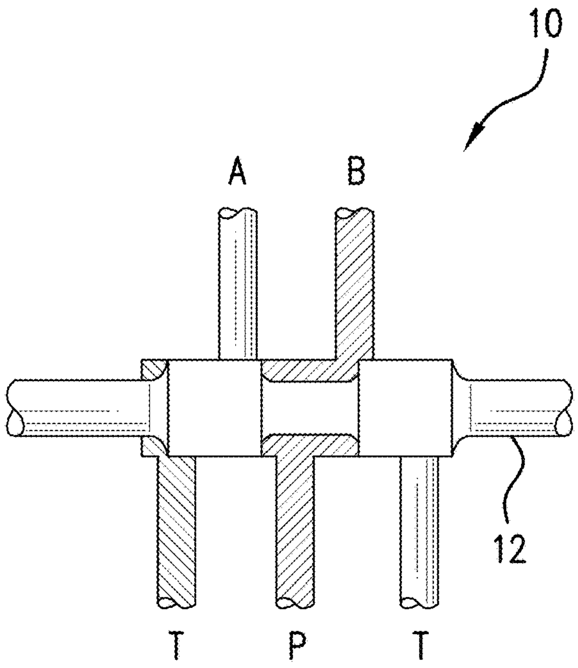
FIG.1A Prior Art
FIGS. 1A and 1B are cross-sectional diagrams of a spool valve.
Figure 1B:
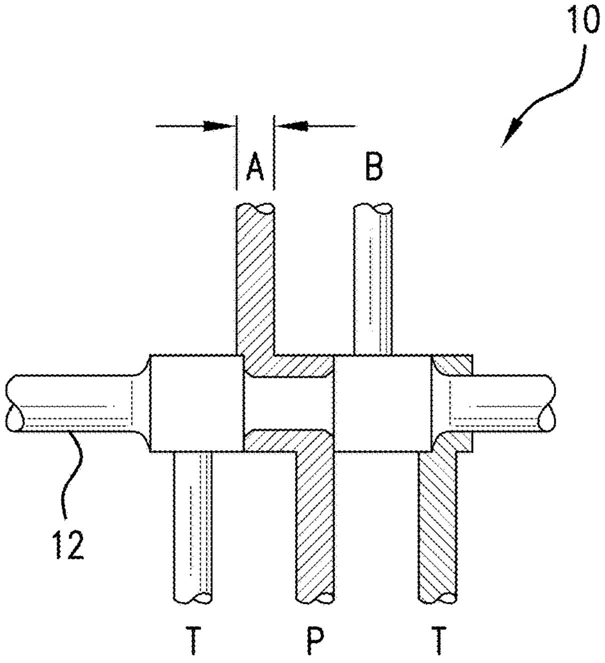
FIG.1B Prior Art

As explained above, prior art systems typically employ one or more spool valves to regulate a metric in such variable-displacement hydraulic pumps. FIGS. 1A and 1B are cross-sectional diagrams of such a spool valve. In FIGS. 1A and 1B, spool valve 10 includes spool 12 and hydraulic ports A, B, T1, P, and T2. FIG. 1A depicts an example EHSV with the spool in a first position, and FIG. 1B depicts the example EHSV with the spool in a second position. The spool 12 can be operated either hydraulically or electrically. For example, in some embodiments, spool 12 can be translated within a cylindrical cavity of spool valve 10 in response to a pressure difference of the hydraulic provided by hydraulic ports T1 and T2. In other embodiments, a solenoid valve can be used on one or both ends of spool 12 to translate spool 12 within the cylindrical cavity of spool valve 10 in response to electrical signals applied thereto. There are several disadvantages to using such spool valves for control operation of variable-displacement hydraulic pumps. For example, spool valves typically have greater mass and require longer valve strokes (i.e., translation of the spool is large) than other types of electro-hydraulic valves. These differences translate into slower response times and/or larger power requirements. Moreover, spool valves tend to have higher leakage than the leakage of other types of electro-hydraulic valves. This difference translates into larger pump throughput requirements. Especially for aircraft applications, it would be advantageous to replace such spool valves with lower mass, lower power, lower leakage, and faster switching electro-hydraulic valves.

Figure 2:
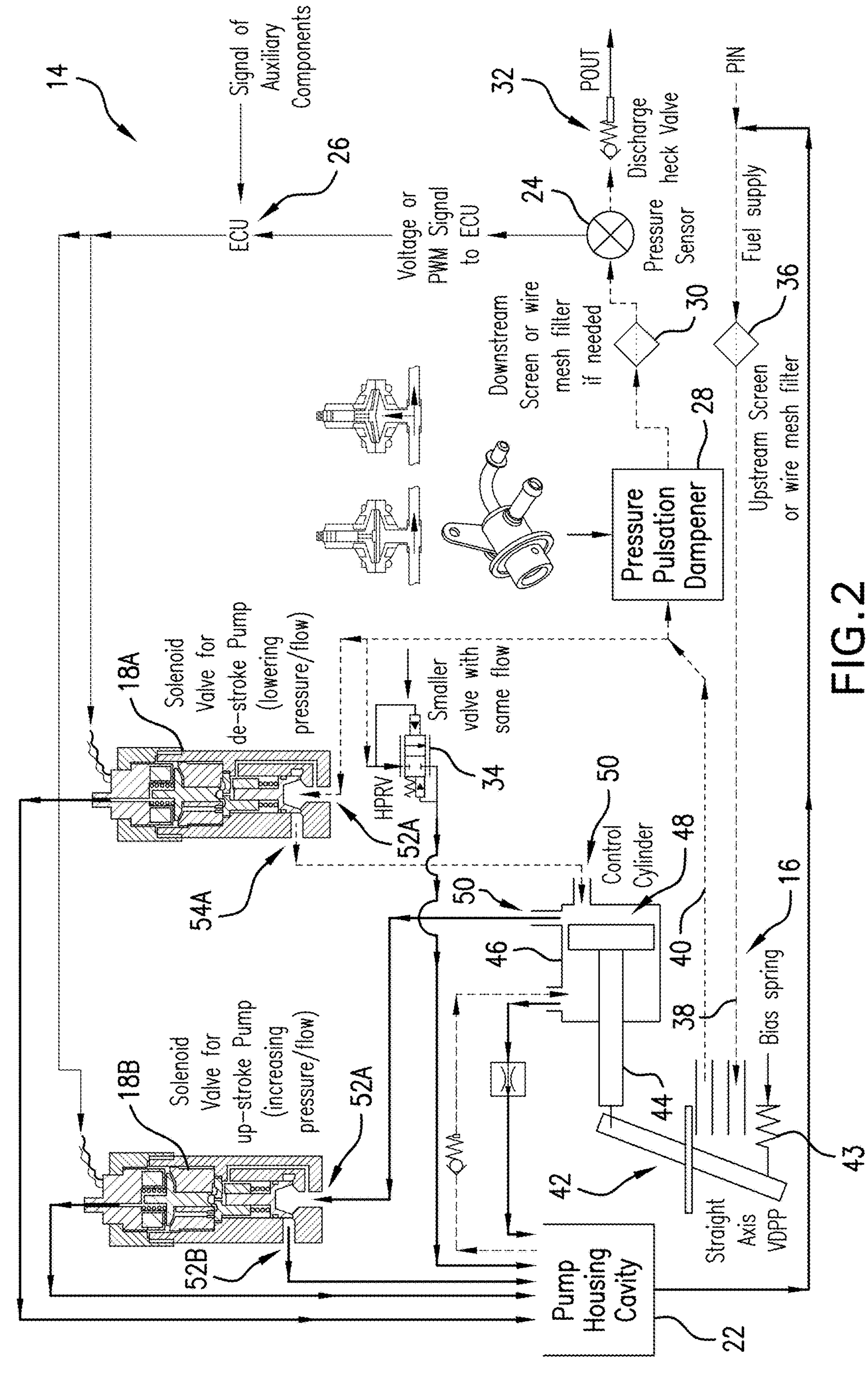
FIG. 2 is a schematic diagram of a variable-displacement hydraulic pump with displacement control using Pulse-Width Modulated (PWM) solenoid valves.

FIG. 2 is a schematic diagram of a variable-displacement hydraulic pump with novel displacement control using Pulse-Width Modulated (PWM) solenoid valves instead of the traditional spool valves, such as those depicted in FIGS. 1A and 1B. In FIG. 2, hydraulic pumping system 14 includes variable-displacement hydraulic pump 16, First PWM solenoid valve 18A, second PWM solenoid valve 18B, hydraulic fluid reservoir 22, pressure sensor 24, electronic control unit 26, pressure pulsation dampener 28, downstream screen 30, discharge check valve 32, High-Pressure Relief Valve (HPRV) 34, and upstream screen 36. Hydraulic pumping system 14 can be configured for pump control of variable-displacement hydraulic pump 16 used in a variety of applications. In one non-limiting embodiment, hydraulic pumping system 14 can be configured to deliver fluid to components of a gas turbine engine. Particularly, hydraulic pumping system 14 can be used to control delivery of fuel to the gas turbine engine.

In the embodiment depicted, variable-displacement hydraulic pump 16 is an inline axial hydraulic control piston pump. Various other types of variable-displacement hydraulic pump can be used. Variable-displacement hydraulic pump 16 has hydraulic input port 38 and hydraulic output port 40. Variable-displacement hydraulic pump 16 is configured to pump hydraulic fluid from hydraulic fluid reservoir 22 in fluid communication with hydraulic input port 38 to a load in fluid communication with hydraulic output port 40. The load (not depicted) is in fluid communication at the node labeled POUT in FIG. 2. Fluid communication between hydraulic fluid reservoir 22 and hydraulic input port 38 is through upstream screen 36, which is configured to filter particulates from the hydraulic fluid passing therethrough. Fluid communication between the load and hydraulic output port 40 is through pressure pulsation dampener 28, downstream screen 30, and discharge check valve 32. Pressure pulsation dampener 28 is configured to reduce fluctuations or pulsations in the pressure and/or flow of the hydraulic fluid provided by output port 40 of variable-displacement hydraulic pump 16. Downstream screen 30 is configured to filter particulates from the hydraulic fluid passing therethrough. Discharge check valve 32 is a one-way valve, such as a poppet valve, configured to prevent return (e.g., backflow) of hydraulic fluid from the load back into hydraulic pumping system 14 via the POUT node.

Variable-displacement hydraulic pump 16 includes mechanical control mechanism 42, which in this embodiment is a swash plate. Mechanical control mechanism 42 is configured to control displacement of hydraulic fluid pumped from hydraulic input port 38 to hydraulic output port 40. The angle of the swash plate determines the stroke of rotating hydraulic control pistons (not depicted) engaged therewith, thereby controlling a volumetric flow and/or pressure of fluid discharged. Bias spring 43 can provide a bias to the swash plate so as to angle or tilt the swash plate in a high stroke position, thereby resulting in a high-pressure, high flow pumping condition. These rotating hydraulic control pistons draw hydraulic fluid into corresponding cylinders from hydraulic input port 38 during an input stroke and then expel the hydraulic fluid through output port 40 during an output stroke. Such control of the angle of the swash plate is performed by hydraulic control piston 44. Variable-displacement hydraulic pump 16 includes hydraulic control piston 44 within hydraulic control cylinder 46, which has hydraulic chamber 48 in fluid communication with hydraulic control port 50. Hydraulic control piston 44 is mechanically coupled to mechanical control mechanism 42 of variable-displacement hydraulic pump 16 so as to advance a position of mechanical control mechanism 42. For an inline axial hydraulic control piston pump, positioning of mechanical control mechanism 42 is an angular positioning of the swash plate, First PWM electro-hydraulic solenoid valve 18A has first and second hydraulic ports 52A and 54A in fluid communication with hydraulic output port 40 and hydraulic control port 50, respectively, thereby regulating fluid conductivity therebetween. First PWM electro-hydraulic solenoid valve 18A is thus configured to control de-stroke of variable-displacement hydraulic pump 16 by facilitating fluid flow into control cylinder 46, which pushes the mechanical control mechanism 42 (e.g., tilts a swash plate) into a desired position. Second PWM electro-hydraulic solenoid valve 18B has third and fourth hydraulic ports 52B and 54B in fluid communication with hydraulic control port 50 and hydraulic input port 38, respectively, thereby regulating fluid conductivity therebetween. Second PWM electro-hydraulic solenoid valve 18B is thus configured to control up-stroke of variable-displacement hydraulic pump 16 by facilitating fluid flow from control cylinder 46, which permits bias spring 43 to return mechanical control mechanism 42 (e.g., tilt a swash plate) into a desired position. In some embodiments, only first PWM electro-hydraulic pump 16 is used for controlling operation of control cylinder 46. In such an embodiment, leakage, or a flow-limited bypass channel can be configured to permit fluid loss from control cylinder 46 in response to return forces applied by bias spring 43.

By regulating fluid conductivities between hydraulic output port 40, hydraulic control port 50, and hydraulic input port 38 in this manner, pressure of hydraulic fluid within hydraulic chamber 48 can be controlled. Such a controlled pressure causes hydraulic control piston to be positioned at a specific location, which then positions mechanical control mechanism 42 to a specific position or configuration. In the embodiment depicted in FIG. 2, first and second PWM electro-hydraulic solenoid valves 18A and 18B work in tandem to regulate pressure at hydraulic control port 50, thereby controlling the position of mechanical control mechanism 42. In other embodiments, the position of mechanical control mechanism 42 can be controlled using only first PWM electro-hydraulic solenoid valve 18A, which regulates fluid conductivity between output port 40 and hydraulic control port 50.

Pressure sensor 24 is configured to measure a metric of output pressure of hydraulic fluid at hydraulic output port 40 of variable-displacement hydraulic pump 16. Such a metric of output pressure can be used to control displacement of hydraulic fluid pumped by variable-displacement hydraulic pump 16. In alternative embodiments, a regulating valve for monitoring fluid flow volume can be provided in place of or in addition to pressure sensor 24 and the volumetric flow can be communicated to electronic control unit 26. In other embodiments, other metrics can be measured by transducers designed to measure such metrics. For example, an angle of the swash plate can be a measured and controlled metric of hydraulic pumping system 14. For bent-axis hydraulic control piston pumps, an angle of the bent axis can be a measured and controlled metric of hydraulic pumping system 14.

Electronic control unit 26 is in conductive communication with pressure sensor 24 and first and second PWM electro-hydraulic solenoid valves 18A and 18B. Electronic control unit 26 can receive a signal indicative of the output pressure, volumetric flow, and/or of a different metric and compare it (them) with a target value(s). The target value can be transmitted to electronic control unit 26 from a remote controller (e.g., from an aircraft). Electronic control unit 26 can then compare the metric measured with the target value received. Electronic control unit 26 can then be configured to generate and transmit a PWM electrical control signal based on the comparison between the metric measured with the target value. For example, using proportional-integral-derivative (PID) control method, electronic control unit 26 can generate the PWM electrical control signal with a specific duty cycle based on the comparison between the metric measured with the target value. Such a PWM electrical control signal is then transmitted by electronic control unit 26 to first PWM electro-hydraulic solenoid valve 18A so as to control the metric measured to within a predetermined control band about a target value. The PWM electrical control signal has a duty cycle configured to control fluid conductivity of the hydraulic fluid flowing from hydraulic output port 40 to hydraulic control port 50, thereby controlling the position of hydraulic control piston 44.

The PWM electrical control signal generated by electronic control unit 26 is configured to cause first PWM electro-hydraulic solenoid valve 18A to decrease fluid conductivity of the hydraulic fluid flowing from hydraulic output port 40 to hydraulic control port 50 in response to decreasing output pressure at output port 40 of variable-displacement hydraulic pump 16. In some embodiments, the frequency of the PWM electrical control signal can be low enough to cause first PWM electro-hydraulic solenoid valve 18A to fully open and close at the duty cycle and frequency of the PWM electrical control signal. In other embodiments, the frequency of the PWM electrical control signal can be high enough to cause first PWM electro-hydraulic solenoid valve 18A to be partially opened at an intermediate position determined by the duty cycle of the PWM electrical control signal. The PWM electrical control signal used to control electro-hydraulic solenoid valves 18A and 18B can be more power efficient than the power efficiencies of many other types of electro-hydraulic valve systems.

Figure 3B:
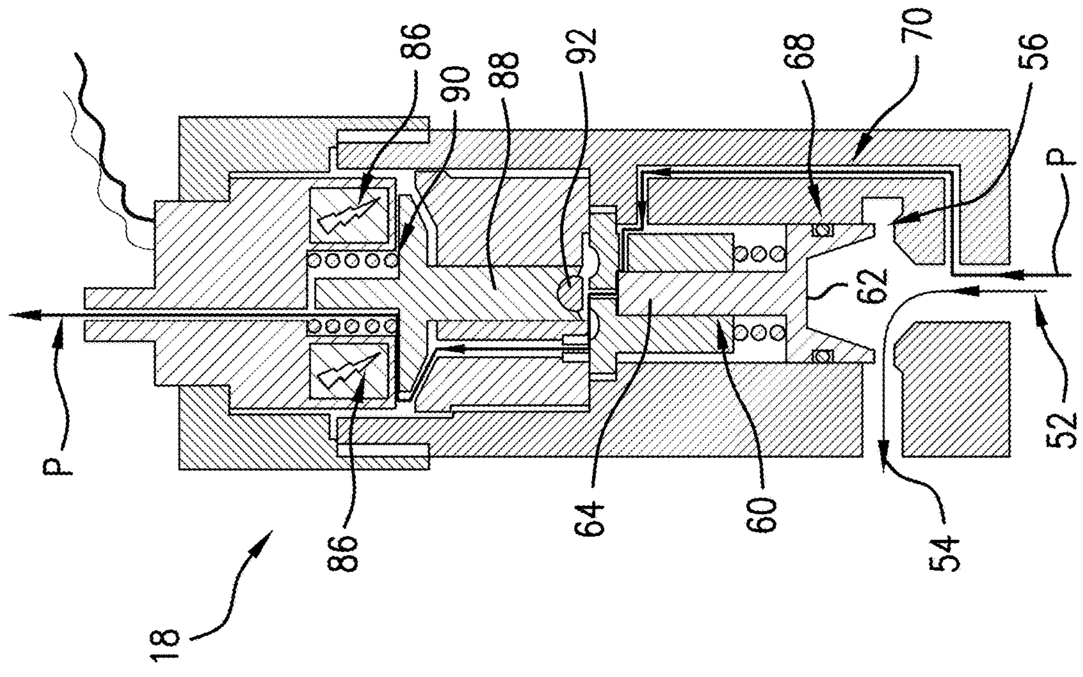
FIGS. 3A and 3B are cross-sectional diagrams of a PWM electro-hydraulic solenoid valve used for controlling displacement in a variable-displacement hydraulic pump.
Figure 3A:
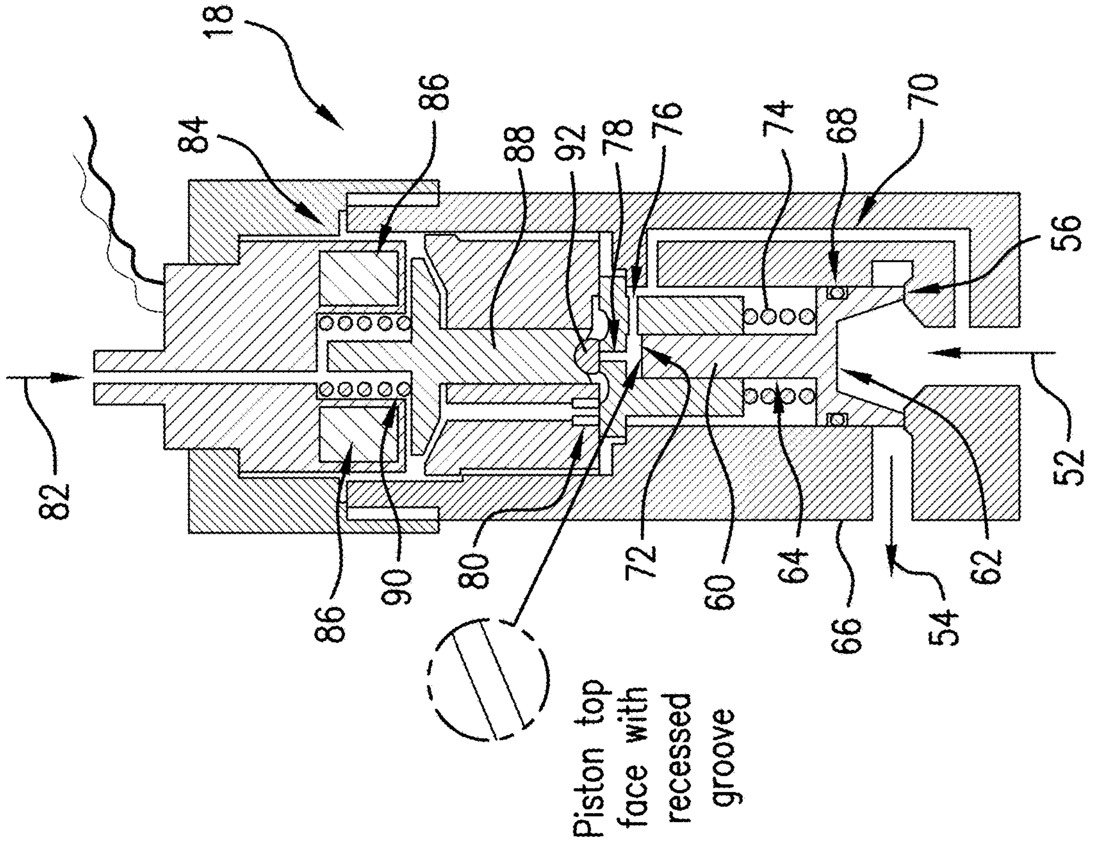

FIGS. 3A and 3B are cross-sectional diagrams of an electro-hydraulic solenoid valve used for controlling displacement in a variable-displacement hydraulic pump. In FIGS. 3A and 3B, electro-hydraulic solenoid valve 18 (which could also have been identified as a PWM electro-hydraulic solenoid valve, if operated in a PWM fashion, such as, for example, first and second PWM electro-hydraulic solenoid valves 18A and 18B, as described above with reference to FIG. 2) is shown as an example of a fast opening and closing electro-hydraulic solenoid valve. FIG. 3A depicts electro-hydraulic solenoid valve 18 in a closed configuration, and FIG. 3B depicts electro-hydraulic solenoid valve 18 in an open configuration. Electro-hydraulic solenoid valve 18 is similar in design to a solenoid fuel injector, as known in the art, with modifications including the replacement of a fuel needle and spray nozzle with valve seat 56, hydraulic piston valve 60, and large diameter flow channel (between first hydraulic port 52 and second hydraulic port outlet 54) and the addition of throttle member 80 to avoid cavitation as the pressure of the hydraulic fluid changes from high to low as it flows out of pressure chamber outlet 78 along fluid path P.

Electro-hydraulic solenoid valve 18 includes hydraulic piston valve 60, which controls fluid communication between first and second hydraulic ports 52 and 54. Hydraulic piston valve 60 has piston head 62 and piston rod 64, each of which is configured to slidably engage valve body 66. Piston ring 68 provides a seal between a perimeter surface of piston head 62 and valve body 66, thereby preventing fluid flow past the perimeter surface of piston head 62. Although piston ring 68 prevents fluid flow past the perimeter surface of piston head 62, fluid flow across piston head 62 is provided by hydraulic channel 70. Hydraulic channel 70 provides fluid communication between a cavity above piston head 62 and a cavity below piston head 62 (as oriented in FIGS. 3A and 3B depictions). Hydraulic channel 70 also provides fluid communication between first hydraulic port 52 at a bottom side of piston head 62 and pressure chamber 72 at a top side of piston rod 64 (as oriented in the FIGS. 3A and 3B depictions).

When hydraulic fluid is not permitted to flow along fluid path P, the pressure of the hydraulic fluid is substantially the same in these three cavities described above. Thus, the pressure of the hydraulic fluid within pressure chamber 72 is substantially equal to the pressure of hydraulic fluid at first hydraulic port 52. When no fluid is permitted to flow through hydraulic channel 70, the pressure of the hydraulic fluid is also substantially equal on both faces (i.e., top face of the piston rod and the top and bottom faces) of piston head 62. The areas of the bottom face of piston head 62 need not be equal to the combined area of the top faces of piston head 62 and piston rod 64, though. Thus, hydraulic forces directed to extending and retracting hydraulic piston valve 60 may not be equal. For example, for normal hydraulic pressures, the hydraulic force directed to extend (i.e., close) hydraulic piston valve 60 can exceed the force directed to retract (i.e., open) hydraulic piston valve 60, or vice-versa, when no fluid flows through hydraulic channel 70. In such a no-flow condition, piston spring 74 is configured to force valve seat 56 (e.g., a sealing face of hydraulic piston valve 60) against a mating surface of electro-hydraulic solenoid valve 18, thereby preventing hydraulic fluid from flowing from first hydraulic port 52 to second hydraulic port 54.

Control of opening and closing hydraulic piston valve 60 is performed by controlling fluid flow through hydraulic channel 70. As described above, when no hydraulic fluid flows through hydraulic channel 70, hydraulic piston valve 60 is extended to seal of second hydraulic port 54 from first hydraulic port 52. When hydraulic fluid flows through hydraulic channel 70, however, the hydraulic pressure changes (i.e., drops) along fluid path P. Thus, when hydraulic fluid flows through hydraulic channel 70 the pressure of the hydraulic fluid at pressure chamber 72 is less than the pressure at first hydraulic port 52. Such pressure imbalance changes the relative magnitudes of the hydraulic forces directed to extending and retracting hydraulic piston valve 60. Piston spring 74 and fluid path P is designed such that when fluid is permitted to flow therethrough, the pressure imbalance across hydraulic piston valve 60 overcomes the spring force of piston spring 74 so as to retract (i.e., open) hydraulic piston valve 60. Fluid path P can be so designed by tailoring channel dimensions (i.e., length and cross-sectional profile), as well as by introducing limiting apertures in fluid path P, as will be described in more detail below. Fluid path P begins at first hydraulic port 52 and enters pressure chamber 72 via pressure chamber inlet 76, then exist pressure chamber 72 via pressure chamber outlet 78, continues through throttle member 80 and ultimately exits electro-hydraulic solenoid valve 18 via return port 82.

Pilot solenoid valve 84 of electro-hydraulic solenoid valve 18 controls fluid conductivity along fluid path P and within hydraulic channel 70. Pilot solenoid valve 84 includes solenoid coil 86, armature 88, armature return spring 90, and ball seal 92. Electrical current in solenoid coil 86 controls position of armature 88. Whan no electrical current is conducted by solenoid coil 86, armature return spring 90 forces ball seal 92 to block the flow of hydraulic fluid through pressure chamber outlet 78, thereby preventing flow of hydraulic fluid along hydraulic path P. When electrical current flows through armature coil 86, armature 88 is retracted by magnetic force, thereby compressing armature return spring 90. Such retraction of armature 88 causes ball seal 92 to disengage from its mating surface, thereby permitting hydraulic fluid to flow through hydraulic channel 70 via the now-unblocked fluid path P. When electric current is again removed from electro-hydraulic solenoid valve 18, the spring force of armature return spring 90 returns armature 88 and ball seal 92 to a closed position. As a result of no current flow through fluid path P, the spring force of piston spring 74 returns valve seat 56 to a closed position as the pressure balance returns in valve body 66 and compression forces of spring 74 causes piston valve 60 to move towards valve seat 56, thereby blocking fluid path P.

As described above, as fluid flows along fluid path P, depressurization of the hydraulic fluid above piston rod 64 results. In response to the pressure imbalance (i.e., the differential pressure) across hydraulic piston valve 60 exceeding the force of piston spring 74, the high-pressure fluid below piston head 62 forces hydraulic piston valve 60 upward, thereby disengaging valve seat 56 from its mating surface. Although it might appear that piston rod 64 blocks fluid path P, when hydraulic piston is forced upward, a top face of the piston rod 64 includes a recessed groove, thereby permitting fluid flow therethrough even when hydraulic piston valve 60 is fully retracted. The differential pressure across hydraulic piston valve 60 is maintained due to the smaller geometry of pressure chamber inlet 76 as compared with pressure chamber outlet 78. A typical diameter of the aperture of pressure chamber inlet 76 is between 0.01 mm and 0.1 mm. A typical diameter of the aperture of pressure chamber outlet 78 is between 0.1 mm and 0.3 mm. The amount of hydraulic fluid (also called "switching leakage") that flows through pressure chamber inlet 76 and pressure chamber outlet 78 is significant smaller than the switching leakage of a typical EHSV valve (as depicted in FIGS. 1A and 1B), and thus these hydraulic solenoid valves have better overall pump control due to faster switching speeds and higher flow efficiency.

Pilot solenoid valve 84 and fluid path P are configured to control the speed at which hydraulic piston valve 60 moves and electro-hydraulic solenoid valve 18 opens. The cross-sectional profile along fluid path P can be designed such that a desired speed at which electro-hydraulic solenoid valve 18 opens. Pressure chamber inlet 76 can be smaller than pressure chamber outlet 78. The diameters of pressure chamber inlet 76 and pressure chamber outlet 78 can be set to define a desired speed at which electro-hydraulic solenoid valve 18 opens. For example, in a non-limiting embodiment, pressure chamber outlet 78 can have a diameter of around 0.2 mm and pressure chamber inlet 76 can have a diameter of about 0.1 mm. The sudden change in pressure created by opening pressure chamber outlet 78 can cause cavitation at the seat of ball seal 92 if the pressure of the fluid exiting pressure chamber outlet 78 drops below the vapor pressure of the hydraulic fluid. Throttle member 80 can be used to control fluid flow and maintain the fluid pressure above the vapor point to prevent damage to ball seal 92.

The stroke length of hydraulic piston valve 60 is very small, which allows for fast opening and closing of valve seat 56 as compared to conventional hydraulic spool valves, which have longer valve movement. For example, a stoke length in non-limiting embodiments can be less than about 300 micrometers or around 250 micrometers. A large diameter at flow channel defined by first hydraulic port 52 and second hydraulic port 54 permits a high volumetric flow with low lift of hydraulic piston valve 60. The large flow area can cause fast movement of the mechanical control mechanism (e.g., the swash plate) and more accurate adjustment of the mechanical control mechanism as compared to conventional hydraulic spool valves. The higher mass of the valve and longer valve movement of conventional hydraulic spool valves causes a delay in switching speed and thereby swash plate movement.

Valve seat 56 is an annular body having an annular sealing land that circumscribes an opening of first hydraulic port 52 in valve body 66, thereby sealing the flow channel to second hydraulic port when electric current is removed from electro-hydraulic solenoid valve 18. In comparison to conventional hydraulic spool valves, which have multiple sealing lands and constant leakage, the only leakage from electro-hydraulic solenoid valve 18 occurs when electro-hydraulic solenoid valve 18 is activated as a small switching leakage through return port 82 occurs when ball seal 92 lifts.

Such a solenoid configuration permits use of hydraulic piston valve 60 of low mass in comparison with a typically mass of a spool valve for the same flow rate for fully open electro-hydraulic valves. Moreover, the stroke of hydraulic piston valve 60 is small in comparison with typical strokes of spools of spool valves for the same flow rate for fully open electro-hydraulic valves. Leakage current of PWM electro-hydraulic solenoid valve 18 is also less than typical leakage currents of spool valves. Moreover, PWM electro-hydraulic solenoid valve 18 has a volumetric pump efficiency that is much greater than that of spool valves.

Discussion of Possible Embodiments

The following are non-exclusive descriptions of possible embodiments of the present invention.

Some embodiments relate to a system for controlling displacement of a hydraulic fluid pumped by a variable-displacement hydraulic pump. The system includes a first electro-hydraulic solenoid valve having input and output hydraulic ports in fluid communication with a hydraulic output port and a hydraulic control port of the variable-displacement hydraulic pump, respectively, thereby regulating fluid conductivity therebetween. The system includes a second electro-hydraulic solenoid valve having input and output hydraulic ports in fluid communication with the hydraulic control port and a hydraulic input port of the variable-displacement hydraulic pump, respectively, thereby regulating fluid conductivity therebetween. Such regulation of fluid conductivity as performed by first and second electro-hydraulic solenoid valves controls fluid displacement through the variable-displacement hydraulic pump. The system includes a transducer configured to measure a metric of the variable-displacement hydraulic pump. The system also includes an electronic control unit in conductive communication with the transducer and the first and second electro-hydraulic solenoid valves. The electronic control unit is configured to generate and transmit electrical control signals to the first and second electro-hydraulic solenoid valves so as to control the metric measured to within a predetermined control band about a target value.

The system of the preceding paragraph can optionally include, additionally and/or alternatively, any one or more of the following features, configurations and/or additional components:

A further embodiment of the foregoing system can further include the variable-displacement hydraulic pump having the hydraulic input port and the hydraulic output port. The variable-displacement hydraulic pump can be configured to pump hydraulic fluid from a hydraulic fluid reservoir in fluid communication with the hydraulic input port to a load in fluid communication with the hydraulic output port. The system can further include a mechanical control mechanism configured to control displacement of hydraulic fluid pumped from the hydraulic input port to the hydraulic output port of the variable-displacement hydraulic pump. The system can further include a hydraulic control piston within a hydraulic control cylinder having a hydraulic chamber in fluid communication with a hydraulic control port, the hydraulic control piston mechanically coupled to the mechanical control mechanism of the variable-displacement hydraulic pump so as to advance a position of the mechanical control mechanism in response to increasing pressure of hydraulic fluid received at the hydraulic control port.

A further embodiment of any of the foregoing systems, wherein the variable-displacement hydraulic pump can be an inline axial hydraulic control piston pump, and the mechanical control mechanism is a swash plate.

A further embodiment of any of the foregoing systems can further include a bias spring configured to bias the hydraulic control piston in a retracted position, thereby biasing the mechanical control mechanism to a maximum fluid displacement configuration.

A further embodiment of any of the foregoing systems, wherein the hydraulic control piston can be configured to increasingly compress the bias spring in response to increasing pressure of hydraulic fluid the hydraulic chamber, thereby biasing the mechanical control mechanism to a less-than-maximal fluid displacement configuration.

A further embodiment of any of the foregoing systems, wherein each of the first and second electro-hydraulic solenoid valves can further include a pressure chamber and a hydraulic piston valve having a valve seat in a piston head. The valve seat can be configured to engage a mating surface, thereby blocking fluid communication between the inlet and outlet ports. In response to pressure of hydraulic fluid in the pressure chamber being substantially equal to pressure of hydraulic fluid at the inlet port, the valve seat configured to disengage the mating surface, thereby facilitating fluid communication between the inlet and outlet ports. In response to the pressure of hydraulic fluid in the pressure chamber being less than the pressure of hydraulic fluid at the inlet porter.

A further embodiment of any of the foregoing systems, wherein each of the first and second electro-hydraulic solenoid valves can further include a piston spring configured to provide a spring force directing the valve seat against the mating surface. The valve seat is configured to disengage the mating surface, thereby facilitating fluid communication between the inlet and outlet ports, in response to a pressure difference between the pressure of hydraulic fluid in the inlet chamber and the pressure of hydraulic fluid at the pressure chamber exceeding the spring force of the piston spring.

A further embodiment of any of the foregoing systems, wherein the valve seat can include a cup having a rim configured to seal an opening of the inlet port and an outer wall configured to seal an opening of the outlet port.

A further embodiment of any of the foregoing systems, wherein each of the first and second electro-hydraulic solenoid valves can further include a pilot solenoid valve configured to control the pressure difference between the pressure of the hydraulic fluid in the inlet chamber and the pressure of the hydraulic fluid at the pressure chamber exceeding the spring force of the piston spring.

A further embodiment of any of the foregoing systems, wherein each of the first and second electro-hydraulic solenoid valves can further include a hydraulic channel fluidly connecting the pressure chamber at a pressure chamber inlet to the hydraulic inlet port, wherein fluid flow from the hydraulic inlet port to the pressure chamber is controlled by the pilot solenoid valve.

A further embodiment of any of the foregoing systems, wherein the pilot solenoid valve of each of the first and second electro-hydraulic solenoid valves can further include: i) a solenoid coil configured to generate a magnetic field in response to electrical current provided thereto; ii) an armature having a fixed magnet configured to retract armature in response to the magnetic field generated by the solenoid; and iii) a ball seal coupled to the armature, the ball seal configured to block a hydraulic outlet port of the pressure chamber in response to the armature not being retracted, thereby preventing hydraulic fluid to flow through the hydraulic channel. The ball seal can be configured to unblock the hydraulic outlet port of the pressure chamber in response to the armature being retracted, thereby enabling hydraulic fluid to flow through the hydraulic channel.

A further embodiment of any of the foregoing systems, wherein each of the first and second electro-hydraulic solenoid valves can include: i) a pressure chamber; ii) a piston valve having a valve seat disposed between the pressure chamber and the hydraulic inlet port; iii) a hydraulic channel fluidly connecting the pressure chamber at a pressure chamber inlet to the hydraulic inlet port; and iv) a ball seal configured to open and close a pressure chamber outlet. The ball seal can be connected to an armature configured to be pulled away from the pressure chamber outlet upon activating each of the first electro-hydraulic solenoid valve and the second electro-hydraulic solenoid valve.

A further embodiment of any of the foregoing systems, wherein a cross-sectional area of the pressure chamber outlet can be larger than the cross-sectional area of the pressure chamber inlet.

A further embodiment of any of the foregoing systems, can further include a throttle member disposed in a fluid conduit connecting an outlet of the second chamber to the housing cavity.

A further embodiment of any of the foregoing systems, wherein the piston valve can include a piston ring disposed about an outer perimeter of the piston head, the piston ring disposed to abut a wall defining the pressure cavity.

Some embodiments relate to a method for controlling displacement of a hydraulic fluid pumped by a variable-displacement hydraulic pump. Fluid conductivity between a hydraulic output port and a hydraulic control port of the variable-displacement hydraulic pump is regulated by a first electro-hydraulic solenoid valve. Fluid conductivity between the hydraulic control port and a hydraulic input port of the variable-displacement hydraulic pump is regulated by a second electro-hydraulic solenoid valve. Such regulation of fluid conductivity as performed by first and second electro-hydraulic solenoid valves can control fluid displacement through the variable-displacement hydraulic pump. A metric of the variable-displacement hydraulic pump is measured by a transducer. Electrical control signals are generated by an electronic control unit and transmitted to the first and second electro-hydraulic solenoid valves, thereby controlling the metric measured to within a predetermined control band about a target value.

The method of the preceding paragraph can optionally include, additionally and/or alternatively, any one or more of the following features, configurations and/or additional components:

A further embodiment of the foregoing method can further include pumping hydraulic fluid, by a variable-displacement hydraulic pump, from a hydraulic fluid reservoir in fluid communication with a hydraulic input port to a load in fluid communication with a hydraulic output port. Displacement of the hydraulic fluid being pumped from the hydraulic input port to the hydraulic output port is controlled by a mechanical control mechanism. The mechanical control mechanism is caused to change position, in response to changes in pressure of hydraulic fluid acting on the hydraulic control piston. The hydraulic fluid acting on the hydraulic control piston resides in a hydraulic chamber in fluid communication with a hydraulic control port.

A further embodiment of any of the foregoing methods can further include biasing, via a bias spring, the hydraulic control piston in a retracted position, thereby biasing the mechanical control mechanism to a maximum fluid displacement configuration. The hydraulic control piston can be configured to increasingly compress the bias spring in response to increasing pressure of hydraulic fluid the hydraulic chamber, thereby biasing the mechanical control mechanism to a less-than-maximal fluid displacement configuration.

A further embodiment of any of the foregoing methods can further include: i) providing a pressure chamber; ii) engaging, via a valve seat in a piston head of the hydraulic piston, a mating surface, thereby blocking fluid communication between the inlet and outlet ports, in response to pressure of hydraulic fluid in the pressure chamber being substantially equal to pressure of hydraulic fluid at the inlet port; and iii) disengaging, via the valve seat, the mating surface, thereby facilitating fluid communication between the inlet and outlet ports, in response to the pressure of hydraulic fluid in the pressure chamber being less than the pressure of hydraulic fluid at the inlet porter.

A further embodiment of any of the foregoing methods can further include providing, via a piston spring, a spring force directing the valve seat against the mating surface. The valve seat can be configured to disengage the mating surface, thereby facilitating fluid communication between the inlet and outlet ports, in response to a pressure difference between the pressure of hydraulic fluid in the inlet chamber and the pressure of hydraulic fluid at the pressure chamber exceeding the spring force of the piston spring.

A further embodiment of any of the foregoing methods can further include controlling, via a pilot solenoid valve, the pressure difference between the pressure of the hydraulic fluid in the inlet chamber and the pressure of the hydraulic fluid at the pressure chamber exceeding the spring force of the piston spring.

A further embodiment of any of the foregoing methods can further include fluidly connecting, via a hydraulic channel, the pressure chamber at a pressure chamber inlet to the hydraulic inlet port. Fluid flow from the hydraulic inlet port to the pressure chamber is controlled by the pilot solenoid valve.

It will be recognized that the invention is not limited to the implementations so described but can be practiced with modification and alteration without departing from the scope of the appended claims. For example, the above implementations may include specific combinations of features. However, the above implementations are not limited in this regard, and, in various implementations, the above implementations may include the undertaking only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

The invention claimed is:

1. A system for controlling displacement of a hydraulic fluid pumped by a variable-displacement hydraulic pump, the system comprising:

a variable-displacement hydraulic pump having a hydraulic input port and a hydraulic output port, the variable-displacement hydraulic pump configured to pump hydraulic fluid from a hydraulic fluid reservoir in fluid communication with the hydraulic input port to a load in fluid communication with the hydraulic output port;

a mechanical control mechanism configured to control displacement of hydraulic fluid pumped from the hydraulic input port to the hydraulic output port of the variable-displacement hydraulic pump;

a first electro-hydraulic solenoid valve having input and output hydraulic ports in fluid communication with the hydraulic output port and the hydraulic control port of the variable-displacement hydraulic pump, respectively, thereby regulating fluid conductivity therebetween;

a second electro-hydraulic solenoid valve having input and output hydraulic ports in fluid communication with the hydraulic control port and the hydraulic input port of the variable-displacement hydraulic pump, respectively, thereby regulating fluid conductivity therebetween, wherein such regulation of fluid conductivity as performed by first and second electro-hydraulic solenoid valves controls fluid displacement through the variable-displacement hydraulic pump;

a transducer configured to measure a metric of the variable-displacement hydraulic pump;

an electronic control unit in conductive communication with the transducer and the first and second electro-hydraulic solenoid valves, the electronic control unit configured to generate and transmit electrical control signals to the first and second electro-hydraulic solenoid valves so as to control the metric measured to within a predetermined control band about a target value; and a hydraulic control piston within a hydraulic control cylinder having a hydraulic chamber in fluid communication with the hydraulic control port, the hydraulic control piston mechanically coupled to the mechanical control mechanism of the variable-displacement hydraulic pump so as to advance a position of the mechanical control mechanism in response to increasing pressure of hydraulic fluid received at the hydraulic control port.

2. The system of claim 1, wherein the variable-displacement hydraulic pump is an inline axial hydraulic control piston pump, and the mechanical control mechanism is a swash plate.

3. The system of claim 1, further comprising:

a bias spring configured to bias the hydraulic control piston in a retracted position, thereby biasing the mechanical control mechanism to a maximum fluid displacement configuration.

4. The system of claim 3, wherein the hydraulic control piston is configured to increasingly compress the bias spring in response to increasing pressure of hydraulic fluid in the hydraulic chamber, thereby biasing the mechanical control mechanism to a less-than-maximal fluid displacement configuration.

5. The system of claim 1, wherein each of the first and second electro-hydraulic solenoid valves comprises:

a pressure chamber; and a hydraulic piston valve having a valve seat in a piston head, the valve seat configured to engage a mating surface, thereby blocking fluid communication between the input and output hydraulic ports, in response to pressure of hydraulic fluid in the pressure chamber being substantially equal to pressure of hydraulic fluid at the input hydraulic port, the valve seat configured to disengage the mating surface, thereby facilitating fluid communication between the input and output hydraulic ports, in response to the pressure of hydraulic fluid in the pressure chamber being less than the pressure of hydraulic fluid at the input hydraulic port.

6. The system of claim 5, wherein each of the first and second electro-hydraulic solenoid valves further comprises:

a piston spring configured to provide a spring force directing the valve seat against the mating surface, wherein the valve seat is configured to disengage the mating surface, thereby facilitating fluid communication between the input and output hydraulic ports, in response to a pressure difference between the pressure of hydraulic fluid at the input hydraulic port and the pressure of hydraulic fluid at the pressure chamber exceeding the spring force of the piston spring.

7. The system of claim 6, wherein the valve seat comprises a cup having a rim configured to seal an opening of the input hydraulic port and an outer wall configured to seal an opening of the output hydraulic port.

8. The system of claim 6, wherein each of the first and second electro-hydraulic solenoid valves further comprises:

a pilot solenoid valve configured to control the pressure difference between the pressure of the hydraulic fluid at the input hydraulic port and the pressure of the hydraulic fluid at the pressure chamber exceeding the spring force of the piston spring.

9. The system of claim 8, wherein each of the first and second electro-hydraulic solenoid valves further comprises:

a hydraulic channel fluidly connecting the pressure chamber at a pressure chamber inlet to the input hydraulic port, wherein fluid flow from the input hydraulic port to the pressure chamber is controlled by the pilot solenoid valve.

10. The system of claim 9, wherein the pilot solenoid valve of each of the first and second electro-hydraulic solenoid valves further comprises:

a solenoid coil configured to generate a magnetic field in response to electrical current provided thereto;

an armature having a fixed magnet configured to retract armature in response to the magnetic field generated by the solenoid; and a ball seal coupled to the armature, the ball seal configured to block a hydraulic outlet port of the pressure chamber in response to the armature not being retracted, thereby preventing hydraulic fluid to flow through the hydraulic channel, the ball seal configured to unblock the hydraulic outlet port of the pressure chamber in response to the armature being retracted, thereby enabling hydraulic fluid to flow through the hydraulic channel.

11. The system of claim 1, wherein each of the first and second electro-hydraulic solenoid valves comprises:

a pressure chamber;

a piston valve having a valve seat in a piston head, the valve seat disposed between the pressure chamber and the input hydraulic port;

a hydraulic channel fluidly connecting the pressure chamber at a pressure chamber inlet to the input hydraulic port; and a ball seal configured to open and close a pressure chamber outlet, the ball seal connected to an armature configured to be pulled away from the pressure chamber outlet upon activating each of the first electro-hydraulic solenoid valve and the second electro-hydraulic solenoid valve.

12. The system of claim 11, wherein a cross-sectional area of the pressure chamber outlet is larger than the cross-sectional area of the pressure chamber inlet.

13. The system of claim 11, further comprising:

a throttle member disposed in a fluid conduit connecting an outlet of the pressure chamber to the housing cavity.

14. The system of claim 11, wherein the piston valve comprises a piston ring disposed about an outer perimeter of the piston head, the piston ring disposed to abut a wall defining the pressure chamber.

15. A method for controlling displacement of a hydraulic fluid pumped by a variable-displacement hydraulic pump, the method comprising:

pumping, via a variable-displacement hydraulic pump, hydraulic fluid from a hydraulic fluid reservoir in fluid communication with a hydraulic input port to a load in fluid communication with a hydraulic output port of the variable-displacement hydraulic pump;

regulating, via a first electro-hydraulic solenoid valve, fluid conductivity between the hydraulic output port and a hydraulic control port of the variable-displacement hydraulic pump;

regulating, via a second electro-hydraulic solenoid valve, fluid conductivity between the hydraulic control port and the hydraulic input port of the variable-displacement hydraulic pump, wherein such regulation of fluid conductivity as performed by first and second electro-hydraulic solenoid valves controls fluid displacement through the variable-displacement hydraulic pump;

controlling, via a mechanical control mechanism, displacement of hydraulic fluid pumped from the hydraulic input port to the hydraulic output port;

positioning, via a hydraulic control piston, the mechanical control mechanism in response to changes in pressure of hydraulic fluid acting on the hydraulic control piston; the hydraulic fluid acting on the hydraulic control piston residing in a hydraulic chamber in fluid communication with the hydraulic control port;

measuring, via a transducer, a metric of the variable-displacement hydraulic pump;

generating, via an electronic control unit, electrical control signals based on the metric measured; and transmitting the electrical control signals to the first and second electro-hydraulic solenoid valves, thereby controlling the metric measured to within a predetermined control band about a target value.

16. The method of claim 15, further comprising:

biasing, via a bias spring, the hydraulic control piston in a retracted position, thereby biasing the mechanical control mechanism to a maximum fluid displacement configuration, wherein the hydraulic control piston is configured to increasingly compress the bias spring in response to increasing pressure of hydraulic fluid the hydraulic chamber, thereby biasing the mechanical control mechanism to a less-than-maximal fluid displacement configuration.

17. The method of claim 15, further comprising:

providing a pressure chamber;

engaging, via a valve seat in a piston head of a piston valve of the first electro-hydraulic solenoid valve, a mating surface, thereby blocking fluid communication between an input hydraulic port and an output hydraulic port of the first electro-hydraulic solenoid valve, in response to pressure of hydraulic fluid in the pressure chamber being substantially equal to pressure of hydraulic fluid at the input hydraulic port; and disengaging, via the valve seat, the mating surface, thereby facilitating fluid communication between the input and output hydraulic ports of the first electro-hydraulic solenoid valve, in response to the pressure of hydraulic fluid in the pressure chamber being less than the pressure of hydraulic fluid at the input hydraulic port.

18. The method of claim 17, further comprising:

providing, via a piston spring, a spring force directing the valve seat against the mating surface, wherein the valve seat is configured to disengage the mating surface, thereby facilitating fluid communication between the input and output hydraulic ports of the first electro-hydraulic solenoid valve, in response to a pressure difference between the pressure of hydraulic fluid in the input hydraulic port and the pressure of hydraulic fluid at the pressure chamber exceeding the spring force of the piston spring.

* * * * *